Aug. 15, 1961   E. T. STRICKLAND   2,995,875
MACHINE TOOL
Filed Aug. 20, 1958   4 Sheets-Sheet 1
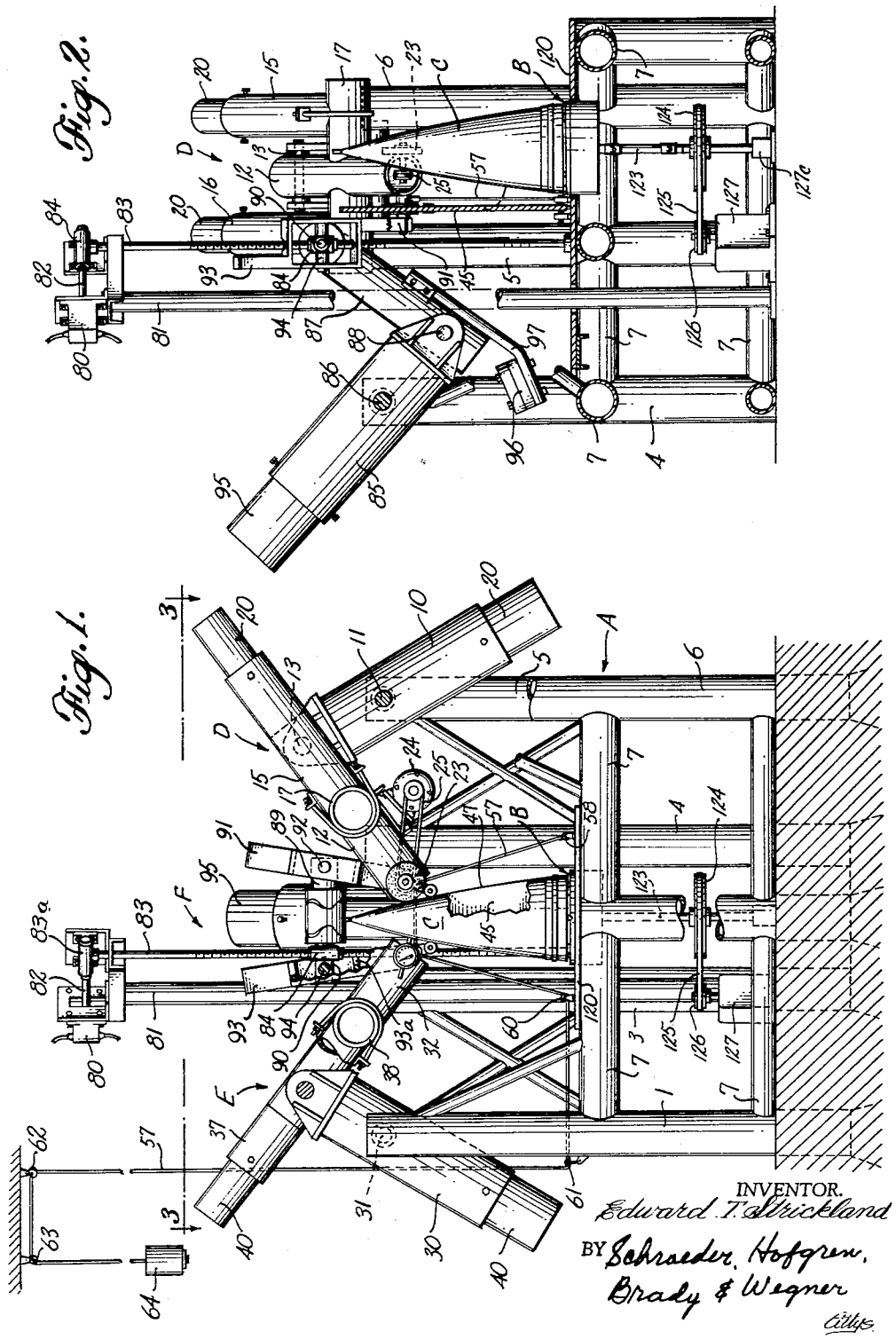
INVENTOR.
Edward T. Strickland
BY Schroeder, Hofgren,
Brady & Wegner
Attys.

Aug. 15, 1961   E. T. STRICKLAND   2,995,875
MACHINE TOOL
Filed Aug. 20, 1958   4 Sheets-Sheet 2
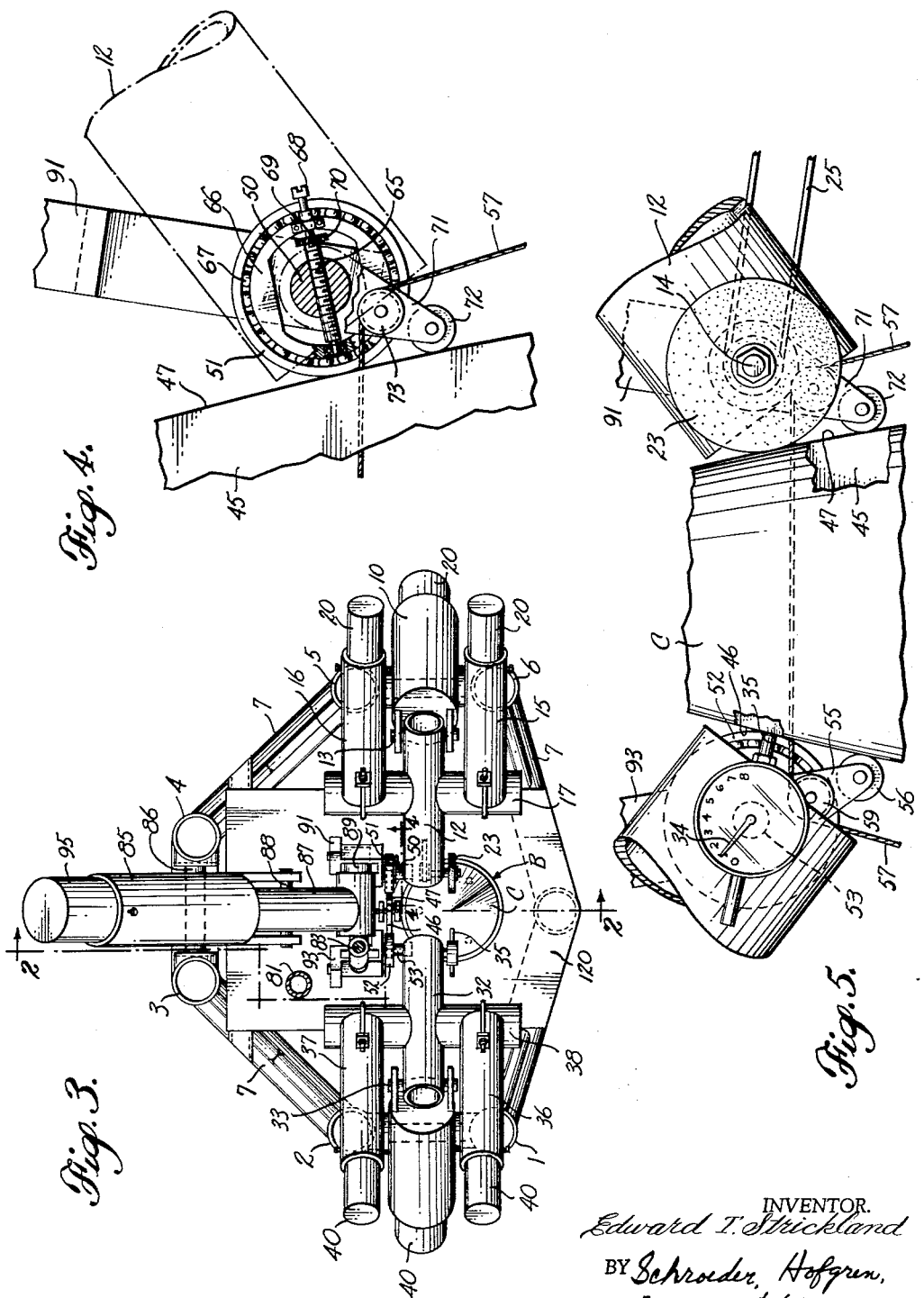
INVENTOR.
Edward T. Strickland
BY Schroeder, Hofgren,
Brady & Wegner
Attys.

Aug. 15, 1961    E. T. STRICKLAND    2,995,875
MACHINE TOOL
Filed Aug. 20, 1958    4 Sheets-Sheet 3

INVENTOR.
Edward T. Strickland
BY Schraeder, Hofgren,
Brady & Wegner
Attys.

Aug. 15, 1961 E. T. STRICKLAND 2,995,875
MACHINE TOOL
Filed Aug. 20, 1958 4 Sheets-Sheet 4

INVENTOR.
Edward T. Strickland
BY Schroeder, Hofgren,
Brady & Wegner
Attys.

United States Patent Office 2,995,875
Patented Aug. 15, 1961

2,995,875
MACHINE TOOL
Edward T. Strickland, Palm Springs, Calif., assignor to Brunswick Corporation, a corporation of Delaware
Filed Aug. 20, 1958, Ser. No. 756,190
18 Claims. (Cl. 51—50)

This invention relates to a machine tool and, more particularly, to a machine in which both grinding and gauging of a work piece take place.

An object of this invention is to provide a new and improved grinding and gauging machine tool for machining a work piece with extreme accuracy.

Another object of this invention is to provide a universal grinding and gauging machine in which both grinding and simultaneous gauging of a work piece of any size and shape, within limits, may be accomplished without relocation of the work piece for gauging, including the use of a pair of identical template profile edges with one profile edge controlling the grinding mechanism and the other profile edge controlling the gauge mechanism.

Another object of the invention is to provide a machine as defined in the preceding paragraph, wherein the template profile edges are formed at opposite edges of a unitary template which may be easily removed and set up in the machine whereby the change of the template is the only change required in changing over from machining one work piece to another.

Another object of the invention is to provide a grinding and gauging machine in which gauging of a work piece is done at a location directly opposite to grinding of the work piece to avoid inaccuracies due to any error of the bearing associated with the turntable which rotatably supports the work piece.

Other objects of the invention are to provide a machine in which a work piece is supported by mechanism which automatically compensates for expansion and contraction of the work piece and its support due to changes in the temperature thereof so as to maintain the rotation axis of the work piece fixed relative to the machine and to provide a floating turntable which utilizes fluid to support the substantial weight of the work piece and its support and which is provided with a relatively thin film of fluid between the turntable and its supporting base to maintain the turntable in a fixed plane of rotation.

Further objects and advantages will become apparent from the following detailed description taken in connection with the accompanying drawings in which:

FIG. 1 is a front elevational view of the machine with parts of the machine and a work piece broken away;

FIG. 2 is a vertical section of the machine taken generally along the line 2—2 in FIG. 3 with parts broken away;

FIG. 3 is a plan view of the machine;

FIG. 4 is a fragmentary vertical section on an enlarged scale taken generally along the line 4—4 in FIG.3;

FIG. 5 is a fragmentary elevational view on an enlarged scale of the grinding wheel and gauge mechanism as shown in FIG. 1 with part of the work piece broken away;

Figure 6:
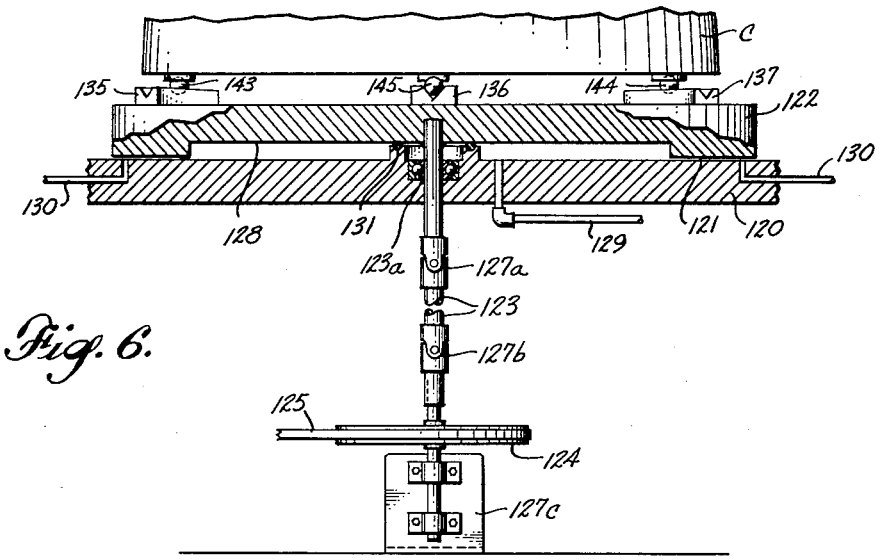
FIG. 6 is a vertical section of the work supporting turntable and its mounting, and is taken generally along the line 6—6 in FIG. 7.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

One specific application of this machine tool is the grinding of air-borne radomes in which electrical transmission and receiving equipment is mounted within the radome. This use requires extreme accuracy in the overall contour of the article, and particularly in the article wall thickness. In order to avoid adverse effects on the transmission of electrical signals, the article wall thickness must not vary more than .001 inch. These requirements necessitate extreme precision in the grinding operation as produced by this apparatus with the simultaneous grinding and gauging, the support arm systems, the accurate template tracking and adjustment, the accurate rotation of the turntable, and the accurate mounting of an article on the turntable.

As indicated generally in the drawings, the machine comprises a base, indicated generally at A, which supports a turntable, indicated generally at B, on which a work piece C may be mounted for rotation about the axis of turntable rotation. A grinding wheel carrier, indicated generally at D, is adapted to support a grinding wheel for movement in a path generally lengthwise of the rotation axis, and a carrier E is adapted to support work piece engaging element, more particularly, a gauge for movement toward and away from the turntable B in a path generally lengthwise of said axis. The carriers D and E are moved in their paths by a drive mechanism, indicated generally at F, under the control of an operator. The carriers D and E are constructed to support the grinding wheel and gauge for universal movement in the plane of the turntable rotation axis, and each has a follower engageable with a template profile edge to control its position relative to the work piece to thereby obtain a controlled dimension of the work piece. In the operation illustrated in the drawings, the exterior surface of a hollow object or work piece mounted on a mandrel is being machined so that a controlled wall thickness is being obtained. With a solid work piece a controlled external dimension of the work piece would be obtained. The gauge indicates any deviations in article wall thickness from the desired dimension because of its being controlled by a template profile which corresponds to the desired article shape and the inner side of the article wall is closely controlled as to contour by the article supporting mandrel. The grinding wheel carrier follower is adjustable to change the relation of the grinding wheel relative to the template to compensate for any deviation in article wall thickness as indicated by the gauge.

The base A includes a series of upstanding posts 1, 2, 3, 4, 5 and 6, which are connected by lateral members 7 into a rigid construction. As shown in FIG. 1, the lower ends of the posts may be imbedded in suitable material to rigidly mount the machine.

The turntable B, more fully described hereinafter, is rotatably mounted in the base A and generally centrally thereof.

The grinding wheel carrier D includes a first carrier arm 10 pivoted intermediate its ends to the posts 5 and 6 by a pivot shaft 11 extending through the upper ends of the posts 5 and 6. A second arm 12 is pivotally connected at one of its ends to the upper end of the arm 10 by a pivot pin 13 extending through the arms.

The grinder support arm 12 rotatably carries a shaft 14 at an end thereof which supports a grinding wheel. Associated with the support arm 12 are a pair of counter balancing arms 15 and 16 connected to cross members 17 which are rigidly secured to the support arm 12. Each of the arms 10, 15 and 16 are provided with a weight 20 which functions to substantially counterbalance the weight of the carrier mechanism D for the grinding wheel. The support arm 12 and structural associated therewith are mounted on the carrier arm 12 in a location to swing the carrier arm 10 toward the turntable B.

The shaft 14 carried on the carrier support arm 12, as shown in FIG. 3, carries a grinding member in the form of a wheel 23 which is driven from a motor 24 by a belt 25. The weights 20 on arms 15 and 16 tend to raise the end of support arm 12 carrying the grinding wheel 23.

The gauge carrier E includes a first support arm 30 pivoted intermediate its ends to the upper ends of posts 1 and 2 by a pivot shaft 31. The first arm 30 has a second arm 32 pivotally connected thereto at one end by a pivot shaft 33 and the second carrier arm 32 carries a gauge mechanism shown in FIG. 5 including a dial with a pointer 34 and a movable stem 35 for operating the pointer 34 relative to the scale on the dial. The gauge carrier E further includes a pair of arms 36 and 37 connected to the second carrier arm 32 by cross members 38. The arms 36 and 37, as well as the first carrier arm 30, each have a weight 40 carried thereon for substantially counterbalancing the weight of the carrier.

The gauge carrier E is located at a side of the turntable B opposite from the grinding wheel D, and this location may be referred to as a 180° position relative to the grinding wheel 23. This is the best position for measuring the part being ground, particularly when grinding an article wall to an electrical thickness. This gauging location reads out bearing error of the turntable due to a slight lobed pattern of the turntable axis of rotation. With an odd number of lobes the pattern disappears at 180°, at which place the gauging takes place.

A template 45 is located on the base A of the machine immediately to the rear of the turntable B and intermediate the carriers D and E, and has a pair of identical template profile edges 46 and 47 at opposite edges thereof. The template profile edges 46 and 47 determine the path of travel of the grinding wheel and the gauge, which path is generally lengthwise of the axis of rotation of the turntable and which includes components transverse to said direction as the grinding wheel and gauge move toward and away from the axis of rotation.

As shown in FIGS. 4 and 5, the grinding wheel support arm 12 carries a shaft 50 which has a profile follower roller 51 supported thereon for engagement with the template profile edge 47. The gauge support arm 32 has a template profile follower roller 52 carried on a rotatable mounting shaft 53 supported by the gauge support arm 32. The follower rollers 51 and 52 are urged toward the template profile edges 47 and 46, respectively, by the general weight arrangement of the carrier support parts.

The gauge movable stem 35 is maintained perpendicular to the template profile edge 46 by an arm 55 carrying a profile engaging roller 56 rigidly secured thereto, which is connected to the mounting shaft 53. The arm 55 extends at an angle of approximately 45° to the gauge stem 35 so as to maintain the gauge stem normal to the profile edge.

In order to maintain the roller 56 against the profile edge 46, a cable 57 is fixed to the base of the machine, as indicated at 58, and extends upwardly about a pulley 59 on the arm 55 and about guide pulleys 60, 61, 62 and 63, and is connected to a weight 64.

The position of the profile follower roller 51 on the grinder support arm 12 may be adjusted by mechanism including a threaded shaft 65 journaled in a collar 66 which forms an inner race for ball bearing 67 on which the follower roller 51 may rotate. An adjusting screw 68 carried on the collar 66 has a worm gear 69 formed thereon which meshes with a gear 70 on the threaded shaft 65, whereby rotation of the adjusting screw 68 rotates the threaded shaft 65 to shift the collar 66 and mechanism carried thereby relative to the main support shaft 50. In order to obtain accurate adjustment and to enable the movement of the adjusting screw to be calibrated to exact amounts and, more particularly, to one thousandth of an inch, the threaded adjusting shaft 65 is constructed to be maintained normal to the template profile edge 47 by mechanism including an arm 71 fixed to the main shaft 50 and carrying a follower roller 72 which contacts the profile edge 47. The arm 71 is arranged at an angle of 45° to the threaded adjusting shaft 65 to maintain the adjusting shaft normal to the profile edge 47. The roller 72 is maintained in engagement with the profile edge by the cable 57 which also passes around a pulley 73 mounted on the arm 71.

In the manufacture of radomes, as stated previously, the article wall thickness is extremely critical. Maintaining the threaded shaft 65 normal to the template profile edge permits adjustment of the grinding wheel as accurately indicated by the gauge.

The grinding wheel and gauge are moved in paths generally lengthwise of the turntable axis of rotation by operating means which includes a reversible motor 80 under the control of an operator and which is mounted on a support column 81. The motor has an output shaft 82 connected to a lead screw 83 by a right angle drive mechanism 83a. The lead screw rotatably connects with a threaded block 84.

The threaded block 84 is carried on mechanism including an arm 85 pivoted intermediate its ends to the upper ends of posts 3 and 4 of the base by a pivot shaft 86. A second interconnecting arm 87 is pivoted adjacent one of its ends to the arm 85 by a pivot shaft 88 and the threaded block 84 is carried at the inner free end of the second arm 87. A pair of lateral extensions 89 and 90 are carried at said end of the second arm 87 with the extension 89 pivotally mounting a generally upright arm 91 by a pivot pin 92. The lower end of the upright arm 91 is connected to the shaft 50 of the grinder support arm 12, as shown in FIG. 4. A second generally upright extension 93 is carried on the lateral extension 90 by a pivot pin 94, and at its lower end is connected to the shaft 53 carried on the gauge support arm 32.

With the foregoing mechanism the movement of the threaded block 84 along the lead screw 83 as the lead screw rotates will result in a compound movement of the interconnecting arm system including arms 85 and 87, and this movement through the generally upright arms 91 and 93 will be transmitted to the support arm 12 of the grinding wheel carrier and the support arm 32 of the gauge carrier. The upright arms 91 and 93 are free to pivot about their pins 92 and 94 to permit generally transverse movement of the grinding wheel and gauge along with the movements thereof generally lengthwise of the turntable axis of rotation and the upright arm 93 is notched at 93a to clear the lead screw 83.

With the foregoing structure it is possible to grind and simultaneously gauge a work piece to maintain a desired wall thickness of a hollow article or a desired external dimension of a part corresponding to a shape of the template profile edges.

In order to partially counterbalance the weight of the interconnecting arm system, a weight 95 is mounted on the arm 85 and a weight 96 is mounted on the arm 87 by a bracket 97, and the weights urge the arms 85 and 87 toward a straight line relation.

The template 45 is mounted in the machine for ease of removal and for ease of setting up in accurate position by mechanism including a rod 100 extending out from both faces of the template 45 with the rod resting in a pair of locating V-blocks 101 and 102 which function to locate the template in one dimension and along a desired center line. A pair of adjusting screws 103 and 104 fixed to the base of the machine threadably connect the template to the base of the machine to locate the template in a plane to be engaged by the follower rollers 51 and 52 and may be adjusted to locate the template pivotally about the axis of the rod 100. The adjusting screws 103 and 104 pass through apertured stops 105 and 106, respectively, attached to the template. Each of the V-blocks 101 and 102 includes a rod clamp including a yoke 107 interlocked with the blocks and a threaded rod clamp screw 108.

Ordinarily, a work piece will have a mandrel located therewithin which is accurately located on the turntable. Before grinding the work piece it is necessary to accurately locate the template 45, and this may be accomplished by approximately locating it in position and then a grind may be made at the top and bottom of the work piece to a depth as determined by the template profile. Gauging of these two grinds will then reveal whether or not the template is properly located relative to the mandrel hidden within the work piece. If the gauge reads the same at both locations of the grind, then the template is properly located. If the gauge readings are different, this then indicates adjustment of the adjusting screws 103 and 104 is necessary to properly align the template. This step may be repeated as many times as necessary.

Figure 7:
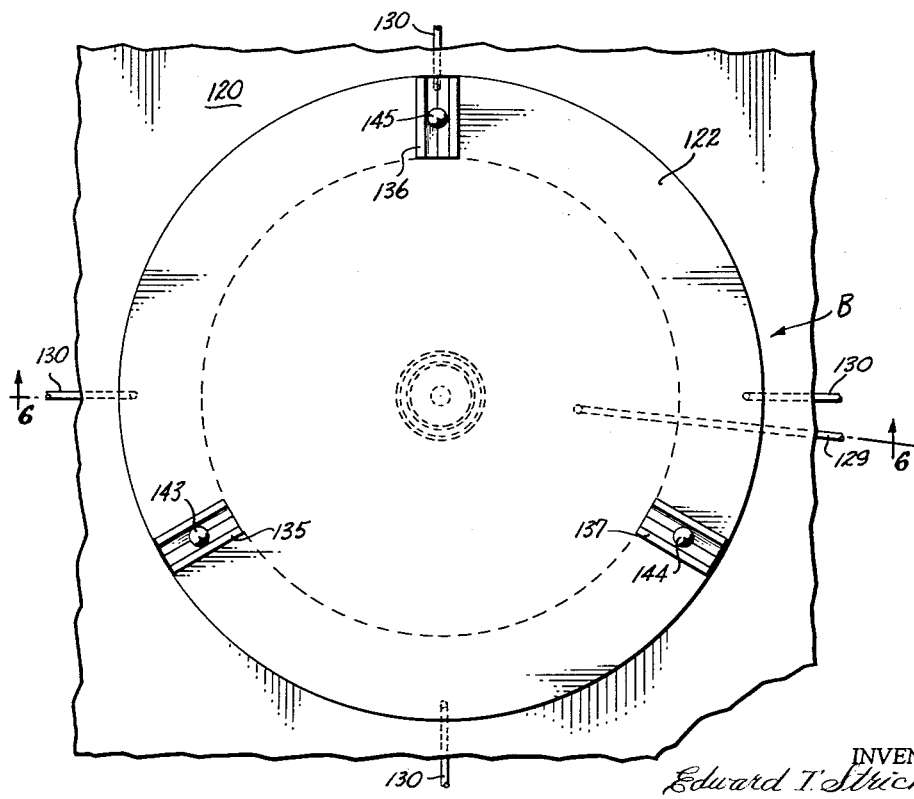
FIG. 7 is a plan view of the turntable shown in FIG. 6.
Figure 10:
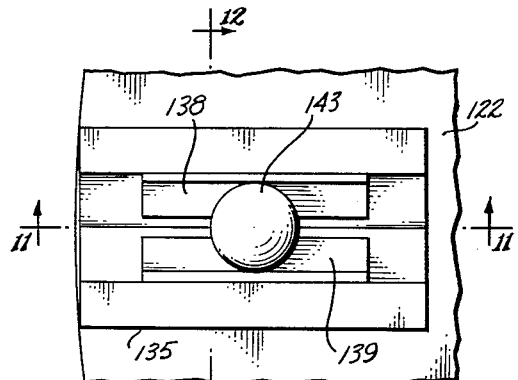
FIG. 10 is a fragmentary plan view on an enlarged scale of part of the work piece and support mounting mechanism shown in FIG. 7.
Figure 11:
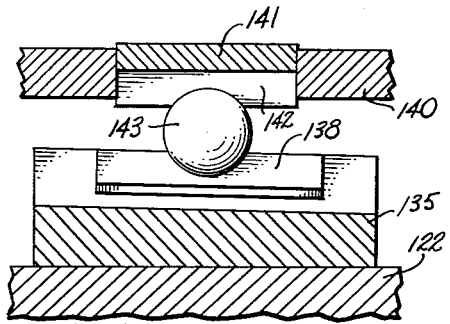
FIG. 11 is a vertical section taken generally along the line 11—11 in FIG. 10.
Figure 8:
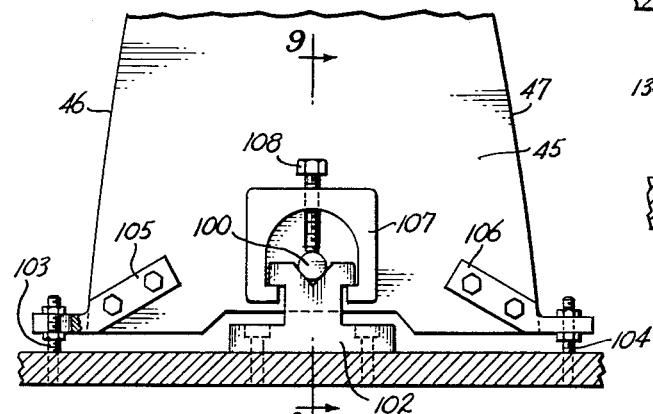
FIG. 8 is a fragmentary elevational view on an enlarged scale of the adjustable mounting for removably holding a template.

As shown in FIGS. 6 and 7, the turntable mechanism B includes a base plate 120 provided with an annular bearing face 121 adjacent its periphery. A turntable 122 having a lower face is disposed adjacent the upper face of the base 120, and is rotatably mounted on the base 120 by a drive shaft 123 which extends downwardly from the turntable through a bearing 123a in base 120 and has a pulley 124 driven by a belt 125 passing around a drive pulley 126 driven by a motor 127. The drive shaft has universal connections 127a and 127b and its lower end is mounted in bearing 127c.

The turntable 122 is floatingly mounted on the base 120 by flowing a fluid between the turntable 122 and the base 120 at a relatively slow rate and a relatively low pressure. The fluid flows into the area between a raised section 128 of the turntable lower face and the face of the base which, in effect, forms a cylinder through a line 129. The fluid exerts a piston effect to support the substantial weight of the turntable, the work piece and a mandrel which supports a work piece on the turntable. The fluid then flows between the lower face of the turntable 122 and the bearing face 121 of the base to provide a very thin film and maintain the turntable rotating in a fixed plane of rotation. The fluid flowing beyond the bearing face is then collected by return pipes 130 and returned to tank (not shown).

As a specific example, a controlled flow of kerosene of approximately one pint per hour at about 3 p.s.i. is fed into the cylinder area. The drive shaft 123 and ball bearing 123a provide lateral placement of the turntable 122 while the fluid in the cylinder area serves as a hydraulic piston carrying most of the weight of the turntable and parts supported thereon.

In order to seal fluid from the drive shaft 123, an O ring 131 is positioned between the turntable and its base.

Figure 12:
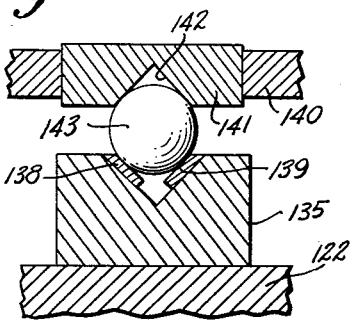
FIG. 12 is a vertical section taken generally along the line 12—12 in FIG. 10.
Figure 9:
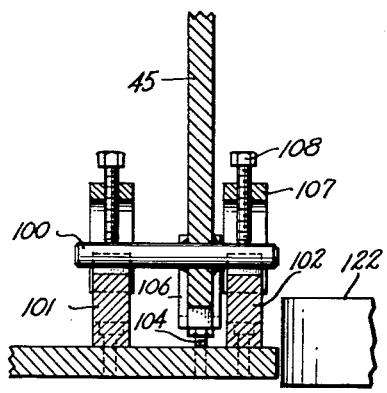
FIG. 9 is a vertical section along the line 9—9 in FIG. 8.
Figure 13:
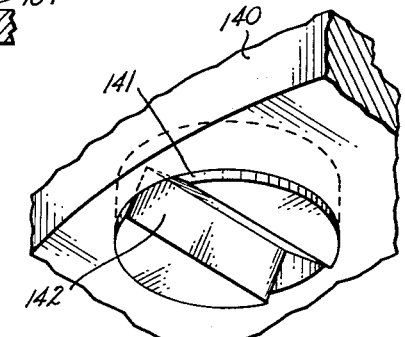
FIG. 13 is a fragmentary perspective view looking upwardly toward the underside of a work piece supporting mandrel showing the locating structure carried thereon.

In the manufacture of radomes, the work piece is normally made up of a laminate embodying thermosetting resins which requires the heating of the work piece supported by a mandrel. The grinding of the surface occurs subsequent to this heating, and it is often desirable to proceed with setting up of the work piece for grinding prior to return of the work piece and mandrel to room temperature. In order to compensate for the slight contraction of the mandrel while returning to normal temperature, mechanism is provided for maintaining the center line of the mandrel and work piece on the axis of turntable rotation. This mechanism includes three members in the form of blocks 135, 136 and 137 disposed in a circular disposition on the upper side of the turntable adjacent the periphery thereof and which are equally spaced from each other. As shown in FIG. 12, each of the blocks has a V-shaped groove with a pair of wear plates 138 and 139 fitted therein. The underside of the mandrel 140 has three similar members in the form of blocks, one of which is shown at 141, which are also equally spaced apart about the periphery of the mandrel and located to overlie the blocks 135, 136 and 137 on the turntable 123. The mandrel blocks 141 each have a downward facing V-shaped groove 142. The grooves in the turntable blocks and in the mandrel blocks all radially extend from the center of the circular disposition of the blocks. A rigid metal ball 143, 144 and 145 is associated one with each of the pairs of blocks and is located between the V-shaped grooves.

With this construction, the mandrel may only properly locate in one position relative to the turntable with the balls 143, 144 and 145 fully seated in the coacting V-shaped grooves. As the mandrel 140 contracts, this contraction may take place without disturbing the aligned relation of the mandrel with the turntable axis of rotation since the mandrel position is at all times controlled by the balls and grooves to maintain the center-line of the mandrel coincident with the turntable axis of rotation.

I claim:

1. A grinding and gauging machine including, in combination, a frame, a turntable rotatable on said frame for supporting a work piece for rotation about an axis, a flat planar template upstanding from the base with opposite profile edges, means at one side of the turntable adapted to support a driven grinding wheel including a pair of upstanding frame posts, a first arm pivoted on said posts for movement about a horizontal axis, a second arm pivoted to said first arm for movement about a horizontal axis and adapted to carry a grinding wheel and a profile edge follower for movement lengthwise and transversely of said work piece rotation axis, means at the opposite side of the turntable for supporting a gauge including a second pair of upstoanding frame posts, a first gauge support arm pivoted on said second posts for movement about a horizontal axis, a second gauge support arm pivoted to said first gauge support arm for movement about a horizontal axis and adapted to carry a gauge and a profile edge follower for movement lengthwise and transversely of said work piece rotation axis, means interconnecting said second arms for simultaneous lengthwise movement including a pair of posts between said other pairs of posts, a first interconnecting arm pivoted on said posts, a second interconnecting arm pivoted on said first arm, and operatively connected to said other second arms to one side of said template, and means engageable with one of said second arms for moving all of said arms lengthwise of said axis.

2. A grinding and gauging machine including, in combination, a frame, a turntable rotatable on said frame for supporting a workpiece for rotation about an axis, means at one side of the turntable adapted to support a driven grinding wheel including an upstanding frame member, a first arm pivoted on said member for movement about a horizontal axis, a second arm pivoted to said first arm for movement about a horizontal axis and adapted to carry a grinding wheel for movement lengthwise of said work piece rotation axis, means at the opposite side of the turntable for supporting a gauge including a second upstanding frame member, a first gauge support arm pivoted on said second member for movement about a horizontal axis, a second gauge support arm pivoted to said first gauge support arm for movement about a horizontal axis and adapted to carry a gauge for movement lengthwise of said work piece rotation axis, means for moving said second arms lengthwise of said axis, a pair of template followers associated one with each of said second arms, and a template associated with said followers.

3. A grinding machine including, a frame, a turntable rotatable on said frame adapted to support a work piece for rotation about an axis, a template having opposite edges lying in a plane normal to the turntable, means adapted to support a driven grinding wheel for movement lengthwise of said axis, including a first arm pivoted to the frame and a second arm pivoted to the first arm, means adapted to support a work piece engaging element for movement lengthwise of said axis, including a first arm pivoted to the frame and a second arm pivoted to the first arm, a pair of template followers associated one with each of said second arms and also one with each of said template edges, and operating means connected to each of said support means for causing simultaneous movement thereof generally lengthwise of said axis including a first operating arm pivoted to the frame, a second operating arm pivoted to the first operating arm, a feed screw connected to the second operating arm, and a movably mounted connecting member from the second operating arm to each of said other second arms.

4. A machine including, a frame, a support on said frame adapted to support a work piece, a template having opposite edges lying in a plane normal to the support, first means adapted to support a work piece engaging element for universal movement in a plane normal to the support including, a first arm pivoted to the frame and a second arm pivoted to the first arm, second means adapted to support a work piece engaging element for universal movement in a plane normal to the support including, a first arm pivoted to the frame and a second arm pivoted to the last mentioned first arm, a pair of template followers associated one with each of said second arms and also one with each of said template edges, and means connected to each of said support means for causing movement thereof in their planes of movement.

5. In a machine for grinding and gauging an article, in combination, a turntable for rotating an article to be ground about an axis, a first carrier adapted to movably support a grinding wheel for movement in a direction generally lengthwise of said axis and toward and away from the turntable, a second carrier adapted to movably support a gauge for movement in a direction generally lengthwise of said axis and toward and away from the turntable, first and second template profile edges extending in a direction generally lengthwise of said axis, means for moving each of said carriers, and means on each of said carriers engageable one with each of said template profile edges for controlling the position of the grinding wheel and the gauge relative to said axis.

6. In an article grinding and gauging machine a base, a work support rotatable on the base and adapted to support a workpiece for rotation, a template projecting from the base in the same direction as a workpiece and mounted adjacent the work support, said template having opposite profile edges each having the desired profile of the workpiece, a grinding wheel carrier movably mounted on the base at one side of the support having a profile edge follower engageable with one profile edge and adapted to support a grinding wheel engageable with a workpiece, a gauge carrier movably mounted on the base at a side of the work support opposite the grinding wheel carrier and having a profile edge follower engageable with the other profile edge and adapted to support a gauge engageable with a workpiece, means for urging said carriers toward each other to cause the followers to engage the template profile edges, and means for moving the carriers in paths along said profile edges.

7. An article grinding machine comprising, a base, a work support adapted to support a work piece for rotation, means for removably holding a template with opposite edges each having the desired profile of the work piece projecting from the base in the same direction as a work piece and mounted adjacent the work support, a grinding wheel carrier movably mounted on the base at one side of the support having a profile edge follower engageable with one profile edge and adapted to carry a grinding wheel engageable with a work piece, a second carrier movably mounted on the base at a side of the work support opposite the grinding wheel carrier and having a profile edge follower engageable with the other profile edge and adapted to support an element engageable with a work pice, and means for moving said support and carriers relative to each other.

8. A grinding and gauging machine comprising a frame, a turntable rotatable on said frame adapted to support a workpiece for rotation about an axis, a relatively flat template having opposite edges lying in a plane normal to the turntable, means at one side of the template adapted to support a driven grinding wheel for movement lengthwise of said axis, means at the other side of the template adapted to support a gauge for movement lengthwise of said axis, a pair of template followers associated one with each of said support means and also one with each of said template edges to control the position of the grinding wheel and gauge relative to the workpiece, means connected to each of said support means for causing simultaneous movement thereof generally lengthwise of said axis, and means for urging each of the support means toward said axis to cause the followers to engage the template.

9. A grinding and gauging machine as defined in claim 8 including, means for removably mounting said template on the frame including a pair of V-grooved blocks one at each side of the template, a rod extending from both sides of the template and resting in said V-grooves, and adjustable fastening members secured between the template and the frame to hold the template in a fixed position rotatably of the rod axis.

10. A machine as defined in claim 8 including means for maintaining the gauge normal to the template edge, and means mounting the follower associated with the grinding wheel support means for adjustment in a direction normal to the template edge.

11. A machine as defined in claim 8 comprising means for maintaining the gauge normal to the template edge, and means for adjusting the follower associated with the grinding wheel support means in a direction normal to the template edge including, a secondary follower connected to a sleeve carrying the follower and an adjusting screw carried on the sleeve for shifting the follower normal to the template edge.

12. A grinding and gauging machine including a frame, a turntable rotatable on said frame adapted to support a workpiece for rotation about an axis, a pair of identical template edges lying in a plane normal to the turntable, means adapted to support a driven grinding wheel for movements generally lengthwise and transversely of said axis, means adapted to support a gauge for movement generally lengthwise, and transversely of said axis, a pair of template followers associated one with each of said support means and one with each of said template edges, and means connected to each of said support means for causing movement thereof generally lengthwise of said axis while urging the support means generally transversely of said axis to maintain the followers in engagement with the template edges.

13. A grinding and gauging machine including, a frame, a member on the frame adapted to support a work piece, a pair of identical template edges lying in a plane generally normal to the member, means adapted to support a driven grinding member for movement generally parallel to said plane, means adapted to support a gauge for movement generally parallel to said plane, a pair of template followers associated one with each of said support means and one with each of said template edges, and means connected to each of said support means for causing movement thereof in their planes of movement.

14. An article grinding machine comprising, a work support rotatable about an axis and adapted to support a work piece for movement therewith, a movable grinding wheel carrier adapted to support a driven grinding wheel for machining the surface of a work piece, a movable carrier adapted to support a work piece engaging element, means for rotating the work support to move the work piece relative to said carriers during a machining operation, and means for shifting said carriers in paths generally lengthwise of said axis, to coact with distinct areas of the work piece.

15. An article grinding and gauging machine comprising, a work support adapted to support a workpiece, a movable grinding wheel carrier adapted to support a driven grinding wheel for machining the surface of a workpiece, a movable gauge carrier adapted to support a gauge for gauging the machine surface of a workpiece, means for moving the workpiece relative to said grinding wheel and gauge carriers during a machining operation, and means for shifting said gauging and grinding wheel carriers in paths along the surface of a workpiece to coact with distinct areas of the workpiece.

16. A machine tool comprising, a base, a support on the base for holding upright a work piece to be machined, a template projecting from the base in the same direction as the work piece, means supporting a machining element for movement in a generally vertical plane including a first arm mounted intermediate its ends for pivotal movement in said plane, a second arm pivoted intermediate its ends to an upper end of the first arm for pivotal movement about the first arm and at a location tending to swing the first arm toward the template, said second arm adapted to carry a machining element at one end thereof, means on the second arm tending to raise said one end thereof, a profile follower on said second arm adapted to engage the template and control the position of the element relative to the work piece, and means engageable with the second arm to move the follower in a direction along the template.

17. A machine as defined in claim 16 wherein said follower moving means includes a translatable member, means for translating said member, and a connecting member pivotally connected to said translatable member and second arm to permit free movement of said second arm in said plane toward and away from the template while moving the follower along said template.

18. A machine as defined in claim 17 including, a third arm pivotally mounted intermediate its ends, a fourth arm pivotally mounted intermediate its ends on the third arm and carrying said translatable member, and means urging said arms toward a straight line relation.

References Cited in the file of this patent
UNITED STATES PATENTS

| | | |
|---|---|---|
| 1,740,006 | Crowley | Dec. 17, 1929 |
| 1,868,275 | Crowley | July 19, 1932 |
| 2,432,161 | Johnston | Dec. 9, 1947 |
| 2,472,902 | Johnston | June 14, 1949 |
| 2,824,413 | Whitehill | Feb. 25, 1958 |